US008830026B2

(12) United States Patent
Mooney et al.

(10) Patent No.: US 8,830,026 B2
(45) Date of Patent: Sep. 9, 2014

(54) SHAPE MEMORY ALLOY ACTUATED CIRCUIT BREAKER

(75) Inventors: Brian Frederick Mooney, Plainville, CT (US); Thomas Frederick Papallo, Plainville, CT (US); Brent Charles Kumfer, Plainville, CT (US)

(73) Assignee: General Electric Company, Schenectady, CT (US)

( * ) Notice: Subject to any disclaimer, the term of this patent is extended or adjusted under 35 U.S.C. 154(b) by 842 days.

(21) Appl. No.: 12/982,226

(22) Filed: Dec. 30, 2010

(65) Prior Publication Data

US 2012/0169451 A1 Jul. 5, 2012

(51) Int. Cl.

| | |
|---|---|
| ***H01H 37/46*** | (2006.01) |
| ***H01H 37/76*** | (2006.01) |
| ***H02H 5/04*** | (2006.01) |
| ***H01H 13/70*** | (2006.01) |
| ***H01H 71/14*** | (2006.01) |

(52) U.S. Cl.
CPC .................................. *H01H 71/145* (2013.01)
USPC ........... 337/382; 337/401; 337/140; 337/365; 337/368; 337/395; 361/103; 361/105; 200/5 R

(58) Field of Classification Search
CPC ..... H05B 1/0216; H01H 37/76; H01H 37/54; H01H 37/5418; H01H 37/323; H01H 2037/5463; H01H 2039/008; H01H 39/00; H01H 61/0107
USPC ................. 337/382, 140, 401, 365, 368, 395; 361/103, 105; 200/5 R
See application file for complete search history.

(56) References Cited

U.S. PATENT DOCUMENTS

| | | | | | |
|---|---|---|---|---|---|
| 2,911,502 | A | * | 11/1959 | Edsall | 337/6 |
| 3,102,933 | A | * | 9/1963 | Berthier | 335/9 |
| 3,138,676 | A | * | 6/1964 | Gratzmuller | 200/82 B |
| 3,153,127 | A | * | 10/1964 | Osmundsen et al. | 337/33 |
| 4,207,381 | A | | 6/1980 | Aisaka et al. | |
| 4,263,573 | A | * | 4/1981 | Melton et al. | 337/140 |
| 4,356,478 | A | * | 10/1982 | Muggli et al. | 340/593 |
| 4,490,975 | A | * | 1/1985 | Yaeger et al. | 60/527 |
| 4,559,512 | A | * | 12/1985 | Yaeger et al. | 337/140 |
| 4,570,143 | A | * | 2/1986 | Bridges et al. | 337/75 |

(Continued)

FOREIGN PATENT DOCUMENTS

| | | | | | |
|---|---|---|---|---|---|
| DE | 9405745 | U1 | | 5/1994 | |
| EP | 37490 | A1 | * | 10/1981 | H01H 37/46 |

(Continued)

OTHER PUBLICATIONS

Search Report and Written Opinion from corresponding EP Application No. 11194746.1, Apr. 2, 2012.

*Primary Examiner* — Bradley Thomas
(74) *Attorney, Agent, or Firm* — Global Patent Operation; Stephen G. Midgley

(57) ABSTRACT

A thermal trip unit for a circuit breaker having a primary conductive path for conducting a load current is provided. The thermal trip unit comprises a shape memory alloy (SMA) member adapted to change from a first shape to a second shape at a predetermined thermal condition, a holding member coupled electrically in series with the circuit breaker primary conductive path, said holding member arranged to operatively support said SMA member, wherein said SMA member is configured and disposed within the circuit breaker to trigger a trip response of the circuit breaker at said predetermined thermal condition.

10 Claims, 4 Drawing Sheets

(56) References Cited

U.S. PATENT DOCUMENTS

| | | | | | |
|---|---|---|---|---|---|
| 4,570,144 | A * | 2/1986 | Bridges et al. | 337/88 |
| 4,616,206 | A * | 10/1986 | Bridges et al. | 337/71 |
| 4,675,642 | A * | 6/1987 | Reiferscheid | 337/140 |
| 4,695,814 | A | 9/1987 | Yoshiaki et al. | |
| 4,713,643 | A * | 12/1987 | Baum et al. | 337/140 |
| 4,797,649 | A | 1/1989 | Homma | |
| 4,806,815 | A | 2/1989 | Honma | |
| 4,825,184 | A * | 4/1989 | Bloch et al. | 336/20 |
| 4,987,314 | A * | 1/1991 | Gotanda et al. | 250/551 |
| 5,001,446 | A * | 3/1991 | Tsuji et al. | 335/43 |
| 5,014,036 | A * | 5/1991 | Komoto | 337/407 |
| 5,033,713 | A * | 7/1991 | Thorsen et al. | 251/11 |
| 5,105,178 | A * | 4/1992 | Krumme | 337/140 |
| 5,107,235 | A * | 4/1992 | Torres-Isea | 335/35 |
| 5,184,269 | A * | 2/1993 | Shimada et al. | 361/24 |
| 5,206,775 | A * | 4/1993 | Wilson | 361/15 |
| 5,420,561 | A | 5/1995 | Swensen | |
| 5,438,309 | A | 8/1995 | Krumme | |
| 5,645,136 | A * | 7/1997 | Byon | 180/274 |
| 5,659,285 | A * | 8/1997 | Takeda | 337/389 |
| 5,771,742 | A * | 6/1998 | Bokaie et al. | 74/2 |
| 5,872,495 | A | 2/1999 | DiMarco et al. | |
| 6,157,288 | A * | 12/2000 | Yamaguchi | 337/405 |
| 6,239,686 | B1 * | 5/2001 | Eder et al. | 337/382 |
| 6,275,136 | B1 * | 8/2001 | Yamaguchi | 337/401 |
| 6,281,781 | B1 * | 8/2001 | Yamaguchi | 337/401 |
| 6,281,782 | B1 * | 8/2001 | Morimoto et al. | 337/401 |
| 6,377,159 | B1 * | 4/2002 | Yu | 337/37 |
| 6,385,026 | B1 * | 5/2002 | Yamaguchi | 361/103 |
| 6,388,554 | B1 * | 5/2002 | Yamaguchi | 337/401 |
| 6,411,190 | B1 * | 6/2002 | Yamaguchi et al. | 337/401 |
| 6,448,884 | B1 * | 9/2002 | Yamaguchi et al. | 337/401 |
| 6,483,420 | B1 * | 11/2002 | Takahashi et al. | 337/401 |
| 6,574,958 | B1 * | 6/2003 | MacGregor | 60/527 |
| 6,734,782 | B2 * | 5/2004 | Kautz et al. | 337/333 |
| 6,803,850 | B2 | 10/2004 | Richter | |
| 6,822,543 | B1 * | 11/2004 | Subramanian et al. | 335/6 |
| 6,916,159 | B2 * | 7/2005 | Rush et al. | 417/321 |
| 7,064,636 | B1 * | 6/2006 | Walz et al. | 335/18 |
| 7,268,660 | B2 * | 9/2007 | Bolda et al. | 337/140 |
| 7,369,022 | B2 * | 5/2008 | Sisson et al. | 335/17 |
| 7,570,146 | B2 * | 8/2009 | Mills et al. | 337/101 |
| 7,852,190 | B1 * | 12/2010 | Woychik et al. | 337/382 |
| 7,928,826 | B1 * | 4/2011 | Woychik et al. | 337/140 |
| 8,051,656 | B1 * | 11/2011 | Cripe et al. | 60/528 |
| 8,220,259 | B1 * | 7/2012 | Cripe et al. | 60/528 |
| 2002/0018331 | A1 * | 2/2002 | Takahashi | 361/103 |
| 2002/0149463 | A1 * | 10/2002 | Kautz et al. | 337/77 |
| 2005/0098413 | A1 * | 5/2005 | Uehira | 200/5 R |
| 2006/0049910 | A1 * | 3/2006 | Bolda et al. | 337/139 |
| 2008/0117006 | A1 | 5/2008 | Claeys et al. | |

FOREIGN PATENT DOCUMENTS

| | | | | | |
|---|---|---|---|---|---|
| EP | 0866484 | A2 | | 9/1998 | |
| GB | 2026246 | A | | 1/1980 | |
| JP | 01057546 | A | * | 3/1989 | H01H 85/00 |
| JP | 04112426 | A | * | 4/1992 | H01H 37/32 |
| JP | 05012969 | A | * | 1/1993 | H01H 37/32 |
| JP | 05012970 | A | * | 1/1993 | H01H 37/32 |
| JP | 5074309 | A | | 3/1993 | |
| JP | 05225882 | A | * | 9/1993 | H01H 71/04 |

* cited by examiner

SHAPE MEMORY ALLOY ACTUATED CIRCUIT BREAKER

BACKGROUND OF THE INVENTION

1. Field of the Invention

The field of the invention relates to circuit breakers generally, and more particularly to certain new and useful advances in circuit breakers having a thermal overload release trip system, of which the following is a specification, reference being had to the drawings accompanying and forming a part of the same.

2. Description of Related Art

Circuit breakers having one or more poles are well known electrical devices. In general, the function of a circuit breaker is to electrically engage and disengage a selected monitored circuit from an electrical power supply. Circuit breakers are intended to provide protection in electrical circuits and distribution systems against electrical faults, such as prolonged electrical overload conditions and short-circuit fault currents, by providing automatic current interruption to the monitored circuit when the fault conditions occur. The protection function is accomplished by directing a current from the monitored circuit through a primary current path through each pole of the circuit breaker and, in response to a detected fault condition, rapidly tripping, i.e., releasing a mechanical latching of an operating mechanism to separate a pair of electrical contacts into a "tripped" OFF position thereby breaking the circuit.

Such conventional circuit breakers typically include both a magnetic and a thermal overload release trip system to sense a fault or overload condition in the circuit and to trigger the tripping response.

The thermal overload release type tripping system of conventional circuit breakers responds to electrical currents moderately above the circuit breaker's current rating by providing a delayed trip of the circuit breaker. The thermal overload release conventionally includes a thermally responsive conductive bimetal member that deflects in response to heating. A flexible conductor, such as a braided copper wire, cooperates with the bimetal member and the circuit breaker mechanism to allow operative movement of the bimetal member along the circuit breaker current path.

In many conventional circuit breakers, the bimetal is electrically connected in series with the primary current path through at least one circuit breaker pole and arranged to deflect in response to Joule effect heating, (i.e., caused by the electrical current through it). In some cases, the bimetal is not disposed as part of the current path and is instead coupled to a heater, such as an inductive-type heater, which provides the current-generated heat to the bimetal.

In the event of an overload current, the circuit breaker bimetal deflects such that it causes a tripping mechanism that includes a spring-biased latch assembly to trigger the separation of a movable contact attached to a movable arm away from a stationary contact to a "tripped" OFF state. For example, the bimetal is often configured and positioned such that the deflection of the bimetal drives a pivot arm, which in turn releases a latch. At a predetermined displacement of the bimetal, the latch will release to allow a stored energy device, such as a spring, to cause the separation of the contacts.

For a circuit breaker employing a conventional thermal overload release, a sufficient minimum trip force must be provided to overcome the mechanical latching forces within the circuit breaker operating and tripping mechanisms.

For a conventional circuit breaker pole, the bimetal is connected in the primary current path through the circuit breaker pole and configured to deflect in response to Joule effect heating. In the event of a predetermined thermal condition, the bimetal contacts and displaces a trip bar. The bimetal is also electrically connected at the first end with the flexible conductor. The flexible conductor accommodates the operable movement of the bimetal on the on the primary current path.

Other known circuit breakers have used a bimetal that is not connected in the primary current path through the circuit breaker pole, but is instead heated by a separate heater element (not shown) that is not in the primary current path of the circuit breaker pole.

A known shortcoming of a conventional circuit breaker thermal overload release devices using either a conductive bimetal, or an indirectly heated bimetal, temperature sensing member, is that the bimetal members are prone to calibration issues which result in a high rejection loss during circuit breaker assembly. Additionally, a welding or brazing process is often used to attach the bimetal to the heater, or to attach the braided flexible conductor to the conductive bimetal, which can cause overheating and damage to the bimetal member. Additionally, the maximum force output and displacement (work output) of conventional bimetal members are relatively close to the minimum required trip force of the circuit breaker tripping mechanism, thus resulting in an undesirably narrow output force tolerance range for the bimetal member.

Another shortcoming of prior art bimetal controlled circuit breakers having a bimetal element connected in the primary conducting path of the circuit breaker is that the bimetal element may be overloaded by fault currents that are too high and thus consequently damaged and rendered inoperable.

Additionally, a shortcoming of circuit breakers having indirectly heated bimetal elements (i.e., not connected in series with the primary current path of the circuit breaker pole), being heated by a separate heater element is that the heater represents an additional part having relatively complex geometry that must be provided and thus requires additional cost.

Prior art circuit breakers have also employed a shape memory alloy (SMA) wire material, instead of a bimetal, as the thermally responsive element connected in the conducting path of circuit breakers to deflect in response to Joule effect heating. When a thermally responsive element made of shape memory alloy of a first original shape is formed to a second selected shape, and then is heated, for example by the Joule effect, the member exerts a force in the direction which will bring its shape nearer to the first original shape via a phase transformation (the reversion transformation from the martensite phase to the parent phase). This force tending towards alteration of the second selected shape of the member towards a first original shape that it "remembers" can be utilized for driving a driven member in a desired direction.

Conventionally, the SMA wire is formed into a particular shape, such as by winding into a coil, and the coil is then arranged to remember a first original shape in which it has a particular first length in its longitudinal direction. In one arrangement, for example, in a non-actuated condition of the SMA wire, the coil is biased to have a particular second axial length, and then, when the coil is heated by the passage of an electric current through it, the coil tries to return to the original first length, thus exerting an actuation or tripping force in its longitudinal direction.

At least one known problem with using a directly heated (i.e. heated by the Joule effect) SMA type temperature sensing member connected in series with the primary conducting path of the circuit breaker pole is that relatively large currents in the primary conductive path of the circuit breaker pole often result in damage to the SMA member response to high level current spikes, such as for example in the case of a short circuit condition. Conversely, at least one known problem with using a directly heated SMA type temperature sensing member connected electrically in parallel with the primary conducting path of the circuit breaker pole is that, since a relatively high temperature is required to activate the SMA member, it is difficult to use arrange a secondary high-resistance current path in parallel with the primary conducting path that provides sufficient heat to reach the activation temperature of the SMA member, while simultaneously preventing overly high temperatures that would result in damage to the SMA member. Still another problem preventing use of using SMA members heated via the Joule effect, is SMA materials are difficult to properly attach to other conductors via welding, brazing, or soldering without damaging the SMA material.

Likewise, at least one known problem preventing the use of indirectly heated (i.e. by a separate heating element) SMA type temperature sensing members is that, since a relatively high temperature is required to activate the SMA, it is difficult to use a separate heating element to provide sufficient heat to reach the activation temperature of the SMA member, while simultaneously preventing overly high temperatures that would result in damage to the SMA member and the heater.

Moreover, yet another problem preventing the use of an indirectly heated SMA type temperature sensing member is that the SMA member requires an additional element to hold, or otherwise support the SMA member.

For at least the reasons stated above, a need exists for a circuit breaker having an improved thermal overload trip function.

BRIEF SUMMARY OF THE INVENTION

One or more specific embodiments shown and/or described herein address at least the above-mentioned need. Apparatus, methods, and systems of varying scope are shown and described herein. In addition to the advantages described above, further advantages and/or adaptations or variations will become apparent by reference to the drawings and by reading the remaining portions of the specification.

Embodiments of the invention provide a thermal trip unit for a circuit breaker, the circuit breaker including a primary conductive path for conducting a load current, comprising a shape memory alloy (SMA) member adapted to change from a first shape to a second shape at a predetermined thermal condition, a holding member configured and disposed to form a portion of the circuit breaker conductive path, said holding member arranged to at least partially enclose said SMA member, wherein said SMA member is configured and disposed within the circuit breaker to trigger a trip response of the circuit breaker at a predetermined thermal condition Embodiments of the invention also provide a circuit breaker, including a primary conductive path for conducting a load current, a thermal trip unit coupled to said primary conductive path, the circuit breaker comprising a shape memory alloy (SMA) member adapted to change from a first shape to a second shape at a predetermined thermal condition, a conductive holding member configured and disposed to form a portion of the circuit breaker conductive path, said holding member arranged to at least partially enclose said SMA member, wherein said SMA member is configured and disposed within the circuit breaker to trigger a trip response of the circuit breaker at the predetermined thermal condition.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

The following description makes reference to the accompanying drawings that form a part hereof, and in which is shown by way of illustration specific embodiments that may be practiced. It is understood that other embodiments may be utilized and that various changes can be made to the embodiments shown and described herein without departing from the patentable scope of the claims appended hereto. The following description is, therefore, not to be taken in a limiting sense.

Figure 1:
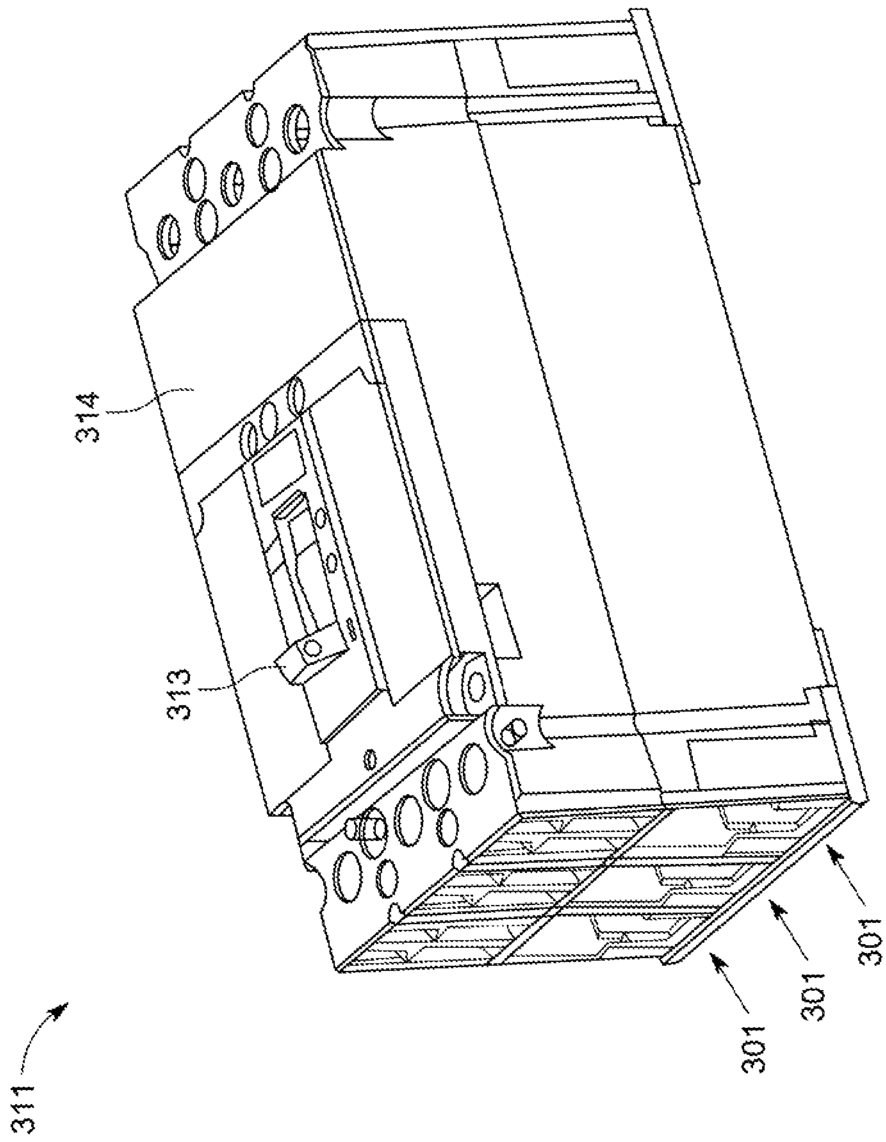
FIG. 1 is a perspective view of an exemplary embodiment of a new three pole circuit breaker.

A configuration of an embodiment of a circuit breaker 311 is shown in FIG. 1. It will be understood that while the embodiment of circuit breaker 311 as shown in FIG. 1 is of the three-pole type, other embodiments of circuit breakers 311 may have one or any number of poles as desired. The circuit breaker comprises a housing 314. A handle 313 protrudes through the housing 314 for manual operation of the circuit breaker 311. The position of handle 313 also provides a visual indication of one of several states of the circuit breaker 311 such as ON, OFF, or TRIPPED.

Figure 2:
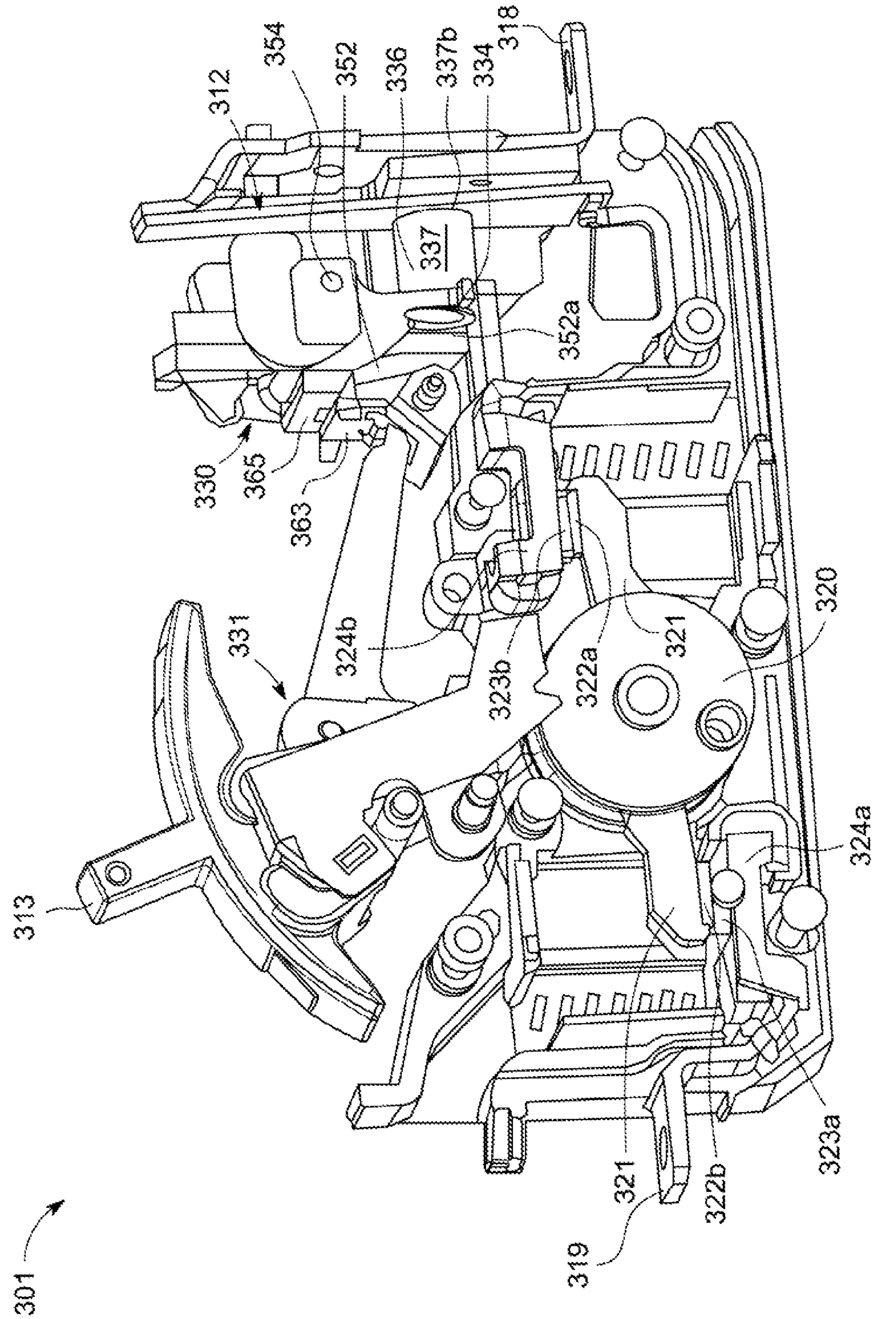
FIG. 2 is a perspective view of a single pole of the embodiment of FIG. 1.

A configuration of a single pole 301 of an embodiment of a circuit breaker 311 in the ON state is shown in FIG. 2 with the housing 314 omitted for clarity. In the ON state, the circuit breaker contacts 322*a*, 323*a*, and 322*b*, 323*b* are closed which allows an electrical current to flow through a primary current path 312 of the circuit breaker pole 301. A TRIPPED state (not shown) of circuit breaker pole 301 may result from automatic activation of the a stored energy tripping mechanism 382 which causes an operating mechanism 331 to separate the contacts 322*a*, 323*a*, and 322*b*, 323*b*. For example, the tripping mechanism 382 may trip in response to a level of current through circuit breaker pole 301 over a predetermined period of time that results in a predetermined thermal condition. Outside of the primary current path 312, the operating mechanism 331, typically in cooperation with the user-operated handle 313, is arranged to move the contact arm 321 such that each movable contact 322*a*, 322*b* is brought into latched engagement with the corresponding stationary contact 323*a*, 323*b* (i.e., to a "closed" ON state), and alternatively separated from the stationary contacts 323*a*, 323*b* (i.e., to an "open" OFF state).

Still referring to the embodiment of FIG. 2, a rotor 320 is configured to movably support a conductive contact arm 321 which is configured to support movable contacts 322*a*, 322*b*. Rotor 320 is further configured and arranged to be rotated via the handle 313 through an operating mechanism 331. The primary current path 312 is arranged such that in operation, at least a majority of the current electrical current in circuit breaker pole 301 flows therethrough. In an exemplary embodiment, primary current path 312 comprises conductive elements preferably electrically connected in series. In an exemplary embodiment, these conductive elements which form the primary current path 312, are a line strap 318, a conductive holder 337, stationary contacts 323*a*, 323*b* and corresponding stationary contact supports 124*a*, 124*b*, the movable contact arm 321, movable contacts 322*a*, 322*b*, and a load connection strap 119.

Figure 3:
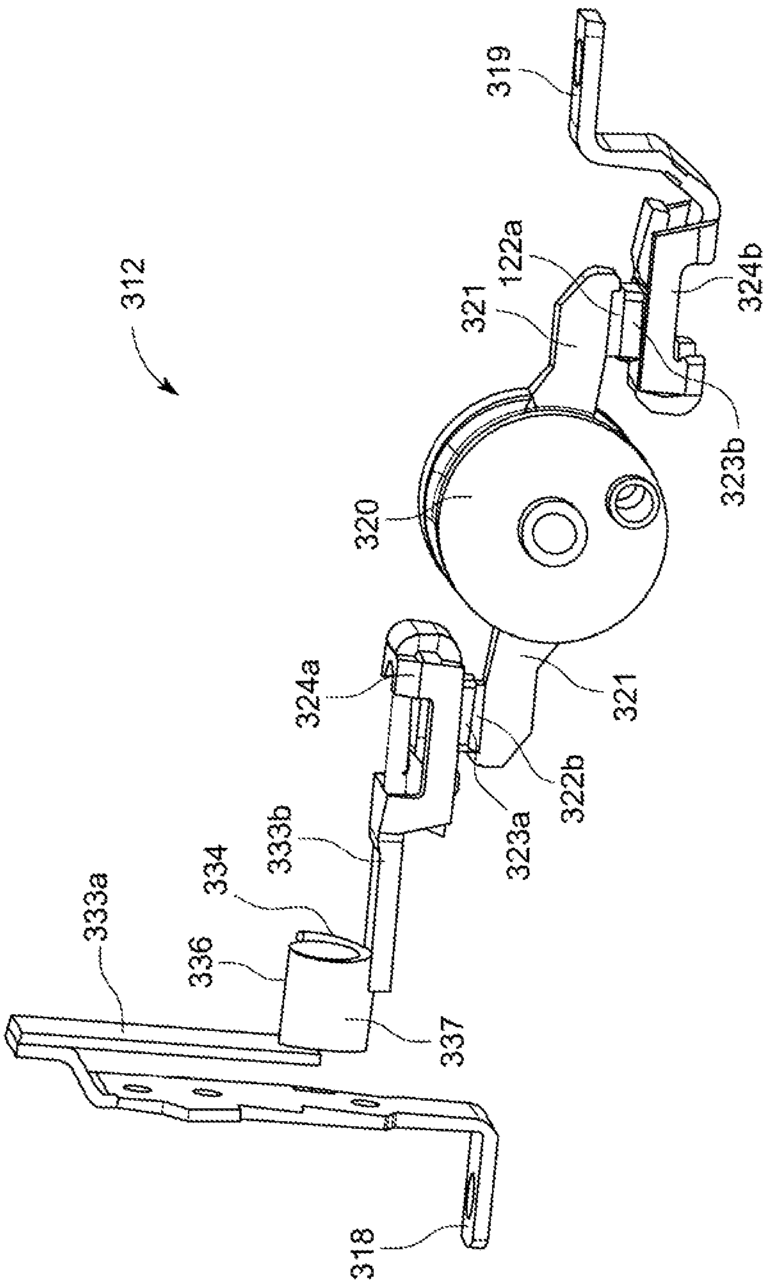
FIG. 3 is a perspective view of the primary current path of the circuit breaker pole of FIG. 2.
Figure 4:
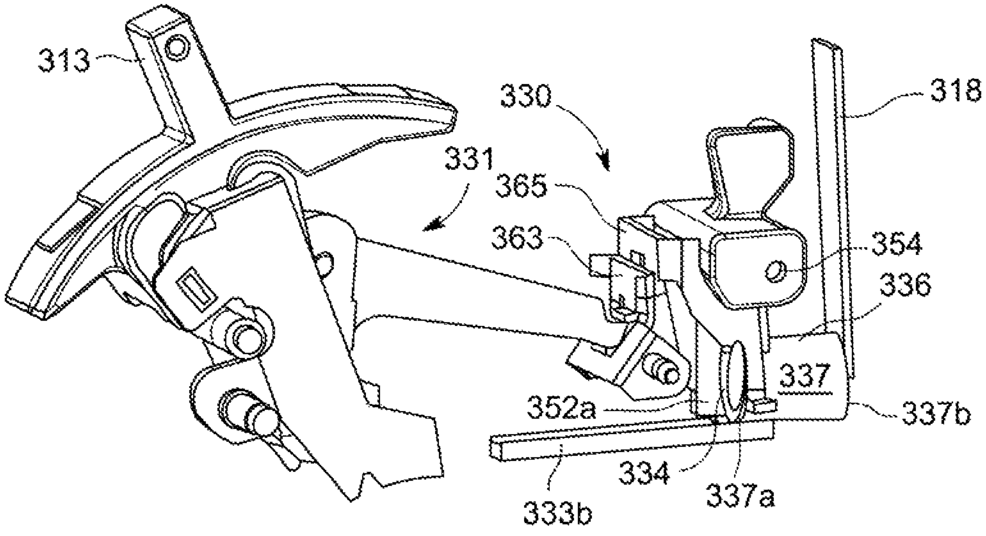
FIG. 4 is a perspective view of a thermal trip unit of an embodiment.
Figure 5:
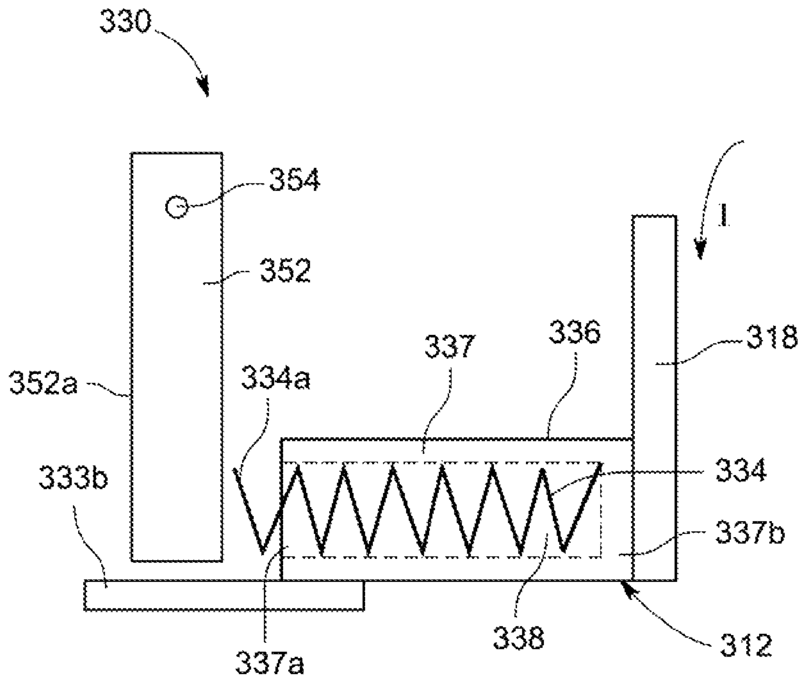
FIG. 5 is a perspective view of an exemplary embodiment.

FIG. 3 illustrates more clearly the exemplary primary current path 312 of the circuit breaker pole 301 of FIG. 2, with all non-current path elements, except rotor 320 and SMA member 334, removed for clarity. The rotor 320 is formed of a suitable material, such as a non-conductive polymer, and is configured to rotably support the movable contact arm 321 including the movable contacts 322*a*, 322*b*. A conventional connection lug (not shown) may be used to couple line side conductors such as cables (not shown) to the line side connection strap 318. Line strap 318 is in turn electrically connected in series with the conductive holder 337, line side stationary contact support 324*a*, stationary contact 323*a*, movable contact 322*a*, contact arm 321, movable contact 322*b*, stationary contact 323*b*, load side stationary contact support 324*b*, and the load side connection strap 319. In an exemplary embodiment, a conductive element 333*a* may be provided in series with the primary conductive path 312 to couple the line side connection strap 318 to holder 347. In other embodiments, the line side connection strap 318 may be directly connected to holder 347. Additionally, in an exemplary embodiment, a conductive element 333*b* may be provided in series with the primary conductive path 312 to couple the line side holder 347 to the load side stationary contact support 324*b*. In other embodiments, the holder 347 may be directly connected to the load side stationary contact support 324*b*. Load strap 319 may also support a conventional connection lug (not shown) to enable a connection to load side conductors such as cables (not shown). The conductive holder 337 is electrically connected in series with and forms a portion of the primary conductive path 312.

Referring again to FIG. 2, a thermal trip unit 330 comprises a SMA member 334 arranged to cooperate with a stored energy tripping mechanism 382 to trigger a trip response of the circuit breaker pole 301. The (SMA) member 334 of thermal trip unit 330 is adapted to change from a first shape to a second shape at a predetermined thermal condition, and further configured and disposed to trigger a trip response of the circuit breaker pole 301 by moving a trip bar 352 to activate the stored energy tripping mechanism 382 in the event of the predetermined thermal condition. For example, the predetermined thermal condition may be caused by a predetermined current level through the circuit breaker pole 301 over a predetermined period of time.

In an embodiment, SMA member 334 is of a coil shape, preferably having a first end 334*a* and a second end 334*b*, and is adapted to elongate at the predetermined thermal condition. The SMA member 334 may also be configured in any number of first shapes, and may be adapted to change to any number of second shapes in the event of the predetermined thermal condition.

In an embodiment, a spring 351 biases a first end 352*a* of the trip bar 352. The first end 352*a* of the trip bar 352 is disposed proximal to the first end 334*a* of the SMA member 334. Trip bar 352 is configured for rotational displacement around an axis 354 located at a second end 352*b* in response to a displacement force from the SMA member 334 sufficient to overcome the bias force of spring 351. The rotation of trip bar 352 causes a primary latch member 363 to release or de-latch from a secondary latch member 365. The release of the primary and secondary latches 354, 363 releases the stored energy tripping mechanism 382 to trip the circuit breaker 311, opening the contacts to the "TRIPPED" off state.

Holder 337 is formed of a suitable conductive material such as hardened copper and arranged to support and at least partially enclose said SMA member 334. The material forming SMA member 334 is selected to have sufficiently high impedance relative to the impedance of conductive holder 337 such that substantially no current flows through the SMA member 334. In an exemplary embodiment, SMA member 334 is formed of nickel titanium (NiTi).

In an exemplary embodiment, and as shown in FIGS. 2-5, holder 337 is formed as a hollow cylinder or tube comprising a conductive cylindrical wall surface 336, defining a tubular cavity 338, a first open end 337*a*, and a second closed end 334*b*. Holder 337 is disposed electrically in series with the primary current path 312 and configured to operatively support and at least partially enclose the SMA member 334, such as an SMA member 334 that is formed of a coil shape.

During operation, with a current flow through the circuit breaker pole 301 via primary current path 312, the current flows through the closed end 337*b* and conductive wall surface 336 of conductive holder 337, without significant current flow through SMA member 334 due to the high impedance of SMA member 334. The current flowing through primary current path 312 heats the holder 337 through Joule effect heating, thus increasing the temperature of the holder 337, whereby the cavity 338 within holder 337 is likewise heated. Consequently, the SMA member 334, disposed within the cavity 338 and being at least partially enclosed by holder 337, is also heated. Thus while the holder 337 is arranged in thermal communication with SMA member 334 (i.e., the holder 337 is configured and disposed to operatively heat said SMA member 334), the primary current path 312 is arranged to substantially limit a current flow through the SMA member.

When heating of SMA member 334 attains a predetermined thermal condition, such as a predetermined temperature, SMA member 334 generates a shape recovery force and changes from a first stressed state to a second stressed state whereby at least a portion of SMA member 334 operatively passes through the open end 337*b* of holder 337 to trigger the trip bar 352 thus tripping the circuit breaker 311. In an exemplary embodiment, in the event of the predetermined thermal condition, such as a predetermined temperature of SMA member 334, SMA member 334 exhibits a shape recovery force and changes from a first relatively compressed coil shape to a second relatively elongated coil shape whereby at least a portion of SMA member 334 operatively passes through the open end 337*b* of holder 337 to contact the trip bar 352 to trigger a trip of the circuit breaker 311.

It is contemplated that holder 337 may be configured having a wide range of dimensions and cross sections, such as for example the length of holder 337 or the volume of cavity 338 may be varied to provide a desired thermal condition at a predetermined current.

In another embodiment, an additional conductive tube 347 is electrically connected to and disposed within the tubular cavity 338 of holding member 337 and further disposed at least partially within the inside diameter of the SMA member 334 coil.

This specification, including the claims, abstract and drawings, is intended to cover any adaptations or variations of the specific embodiments illustrated and described herein. Accordingly, the names of elements, components or features, of the above-described system, methods, and apparatus are not intended to be limiting. It is contemplated that the above-described embodiments, whether adapted or varied or not, are applicable to future devices and apparatus. Moreover, the terminology used herein is intended to encompass all devices and apparatus that provide the same or equivalent functionality described herein.

Although effort was made to show all of the particular elements, components or features of each of the above-described specific embodiments in separate figures, this may not have been possible. In the event that one or more elements, components or features of one or more of the above-described specific embodiments are shown in some drawings and not in others, it is contemplated that each element, component or feature of one drawing may be combined with any or all of the other elements, components or features shown in any or all of the remainder of the drawings, as described herein, as claimed herein or in any other suitable fashion.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

The words "including", "comprising", "having", and "with" as used herein are to be interpreted broadly and comprehensively and are not limited to any physical interconnection. Additionally, patentable scope is defined by the following claims, which are intended to encompass not only the specific embodiments described above, but also adaptations or variations thereof (i) that have structural elements that do not differ from the literal language of the claims, or (ii) that have equivalent structural elements with insubstantial differences from the literal language of the claims.

What is claimed is:

1. A thermal trip unit for a circuit breaker, the circuit breaker including a primary conductive path having a first impedance for conducting a load current, the thermal trip unit comprising:

a shape memory alloy (SMA) member having a coil shape defining an inside diameter, and having a second impedance, the SMA member adapted to change from a first shape to a second shape at a predetermined thermal condition;

a holding member comprising a cavity configured to receive said SMA member therein, the holding member being coupled electrically in series with the circuit breaker primary conductive path, said holding member arranged to operatively support said SMA member;

a conductive tube, said tube being electrically connected to said holding member and disposed within said holding member cavity and further disposed at least partially within the inside diameter of said SMA member;

wherein said SMA member is at least partially disposed within said cavity and arranged to trigger a trip response of the circuit breaker at said predetermined thermal condition;

wherein said primary conductive path is operatively arranged and disposed to substantially limit a current flow through the SMA member and wherein the first impedance is less than the second impedance.

2. The thermal trip unit of claim 1 wherein said holding member is further configured and disposed to operatively heat said SMA member.

3. The thermal trip unit of claim 1 wherein said SMA member is adapted to elongate at said predetermined thermal condition.

4. A circuit breaker pole, comprising:

a primary conductive path having a first impedance, for conducting a load current a thermal trip unit, coupled to said primary conductive path, said trip unit comprising:

a shape memory alloy (SMA) member haying a coil shape defining an inside diameter and having a second impedance, adapted to change from a first shape to a second shape at a predetermined thermal condition;

a holding member comprising a cavity configured to receive said SMA member therein, said holding member coupled electrically in series with the circuit breaker primary conductive path, and arranged to operatively support said SMA member;

a conductive tube, said tube being electrically connected to said holding member and located within said holding member cavity and at least partially within the inside diameter of said SMA member;

wherein said SMA member is at least partially disposed within said cavity, and configured to trigger a trip response of the circuit breaker at said predetermined thermal condition; and wherein the first impedance is less than the second impedance.

5. The circuit breaker pole of claim 4 wherein said primary conductive path is operatively arranged and disposed to substantially limit a current flow through the SMA member.

6. The circuit breaker pole of claim 5 wherein said SMA member is adapted to elongate at said predetermined thermal condition.

7. The circuit breaker pole of claim 4 wherein said holding member is further configured and disposed to operatively heat said SMA member.

8. A circuit breaker, comprising:

a pole comprising a primary conductive path haying a first impedance for conducting a load current;

a thermal trip unit, coupled to said primary conductive path, said trip unit comprising:

a shape memory alloy (SMA) member having a coil shape defining an inside diameter and having a second impedance, said SMA adapted to change from a first shape to a second shape at a predetermined thermal condition;

a holding member comprising a cavity configured to receive said SMA member therein, said holding member coupled electrically in series with the circuit breaker primary conductive path, and arranged to operatively support said SMA member;

a conductive tube, said tube being electrically connected to said holding member and located within said holding member cavity and at least partially within the inside diameter of said SMA member;

wherein said SMA member is at least partially disposed within said cavity, and configured to trigger a trip response of the circuit breaker at said predetermined thermal condition; and wherein said primary conductive path is operatively arranged and disposed to substantially limit a current flow through the SMA member;

and wherein the first impedance is less than the second impedance.

9. The circuit breaker of claim 8 wherein said holding member is further configured and disposed to operatively heat said SMA member.

10. The circuit breaker of claim 8 wherein said SMA member is adapted to elongate at said predetermined thermal condition.

* * * * *

UNITED STATES PATENT AND TRADEMARK OFFICE

CERTIFICATE OF CORRECTION

PATENT NO. : 8,830,026 B2
APPLICATION NO. : 12/982226
DATED : September 9, 2014
INVENTOR(S) : Mooney et al.

It is certified that error appears in the above-identified patent and that said Letters Patent is hereby corrected as shown below:

On the Title Page, item (73), under “Assignee”, in Column 1, Line 2, delete “CT (US)” and insert -- NY (US) --, therefor.

In the Claims

In Column 8, Line 5, in Claim 4, delete “haying” and insert -- having --, therefor.

In Column 8, Line 33, in Claim 8, delete “haying” and insert -- having --, therefor.

Signed and Sealed this
Nineteenth Day of May, 2015

Michelle K. Lee
*Director of the United States Patent and Trademark Office*